(12) United States Patent
Piracha

(10) Patent No.: US 11,584,358 B2
(45) Date of Patent: Feb. 21, 2023

(54) METHOD FOR SYNCHRONISATION OF A FIRST TRANSMISSION COMPONENT

(71) Applicant: Ningbo Geely Automobile Research & Development Co., Ltd., Ningbo (CN)

(72) Inventor: Muddassar Piracha, Gothenburg (SE)

(73) Assignee: NINGBO GEELY AUTOMOBILE RESEARCH & DEVELOPMENT CO., LTD., Ningbo (CN)

( * ) Notice: Subject to any disclaimer, the term of this patent is extended or adjusted under 35 U.S.C. 154(b) by 292 days.

(21) Appl. No.: 16/846,812

(22) Filed: Apr. 13, 2020

(65) Prior Publication Data

US 2020/0238973 A1 Jul. 30, 2020

Related U.S. Application Data

(63) Continuation of application No. PCT/CN2018/109906, filed on Oct. 11, 2018.

(30) Foreign Application Priority Data

Oct. 20, 2017 (EP) .................................... 17197540

(51) Int. Cl.
*B60W 30/19* (2012.01)
*B60W 20/30* (2016.01)
(Continued)

(52) U.S. Cl.
CPC ............... *B60W 20/30* (2013.01); *B60K 6/26* (2013.01); *B60K 6/28* (2013.01); *B60K 6/36* (2013.01);
(Continued)

(58) Field of Classification Search
CPC .. B60K 6/26; B60K 6/38; F16H 59/18; F16H 59/38; F16H 59/70; F16H 61/0403;
(Continued)

(56) References Cited

U.S. PATENT DOCUMENTS 5,337,848 A 8/1994 Bader
6,325,743 B1 * 12/2001 Genise ................... B60W 10/11
74/335
(Continued)

FOREIGN PATENT DOCUMENTS

CN 101907136 A 12/2010
CN 102029890 A 4/2011
(Continued)

OTHER PUBLICATIONS

International Search Report and Written Opinion from corresponding International Patent Application No. PCT/CN2018/109906, dated Jan. 4, 2019, 9 pages.
(Continued)

*Primary Examiner* — Roger L Pang
(74) *Attorney, Agent, or Firm* — Tucker Ellis LLP

(57) ABSTRACT

A method for performing rotational speed synchronisation of a first transmission component having a first initial rotational speed with a second transmission component having a second initial rotational speed, so that they rotate with the same final rotational speed during a gear switch from an initial driving gear to a final driving gear in a stepped gear transmission for a hybrid electric or electric drive train having an electric traction motor. The method including calculating a total frictional work resulting from performing the total rotational speed synchronisation by means of a mechanical synchroniser of the stepped gear transmission only, and if the calculated total frictional work exceeds a maximal frictional work of the mechanical synchroniser, performing the rotational speed synchronisation by means of both the electric traction motor and the mechanical synchroniser.

21 Claims, 6 Drawing Sheets

(51) Int. Cl.
*B60K 6/26* (2007.10)
*B60K 6/28* (2007.10)
*B60K 6/36* (2007.10)
*B60K 6/38* (2007.10)
*B60W 10/08* (2006.01)
*B60W 10/11* (2012.01)
*F16H 59/18* (2006.01)
*F16H 59/38* (2006.01)
*F16H 59/70* (2006.01)
*F16H 61/04* (2006.01)
*F16H 61/688* (2006.01)
*F16H 59/14* (2006.01)
*F16H 59/68* (2006.01)

(52) U.S. Cl.
CPC ............... *B60K 6/38* (2013.01); *B60W 10/08* (2013.01); *B60W 10/11* (2013.01); *B60W 30/19* (2013.01); *F16H 59/18* (2013.01); *F16H 59/38* (2013.01); *F16H 59/70* (2013.01); *F16H 61/0403* (2013.01); *F16H 61/688* (2013.01); *B60W 2510/1005* (2013.01); *B60W 2510/244* (2013.01); *B60W 2540/10* (2013.01); *B60W 2710/08* (2013.01); *B60W 2710/10* (2013.01); *B60Y 2200/91* (2013.01); *B60Y 2200/92* (2013.01); *F16H 2059/147* (2013.01); *F16H 2059/148* (2013.01); *F16H 2059/6807* (2013.01); *F16H 2061/0418* (2013.01); *F16H 2061/0422* (2013.01)

(58) Field of Classification Search
CPC ............. F16H 61/688; F16H 2059/147; F16H 2059/148; F16H 2059/6807; F16H 2061/0418; F16H 2061/0422; B60W 30/19; B60W 2710/08; B60W 2710/10; B60W 20/30; B60W 10/08; B60W 10/11; B60W 2510/1005; B60W 2510/244; B60W 2540/10
USPC .................................................. 74/335; 477/3
See application file for complete search history.

(56) References Cited

U.S. PATENT DOCUMENTS

2002/0033059 A1    3/2002  Pels et al.
2016/0109020 A1*   4/2016  Park .................... F16H 61/0403
                                                            192/3.61

FOREIGN PATENT DOCUMENTS

| CN | 102463987 A | | 5/2012 | |
| CN | 104930180 A | | 9/2015 | |
| CN | 105975670 A | | 9/2016 | |
| CN | 106945502 A | | 7/2017 | |
| CN | 111845700 A | * | 10/2020 | |
| DE | 102010035776 A1 | | 3/2012 | |
| EP | 1270301 A2 | | 1/2003 | |
| WO | 2007141437 A1 | | 12/2007 | |
| WO | 2007141438 A1 | | 12/2007 | |
| WO | WO-2011124866 A1 | * | 10/2011 | ......... F16H 61/0403 |
| WO | 2012000142 A1 | | 1/2012 | |

OTHER PUBLICATIONS

Extended European Search Report from corresponding European Application No. 17197540.2, dated Aug. 7, 2018, 12 pages.

* cited by examiner

METHOD FOR SYNCHRONISATION OF A FIRST TRANSMISSION COMPONENT

RELATED APPLICATION DATA

This application is a continuation of International Patent Application No. PCT/CN2018/109906, filed Oct. 11, 2018, which claims the benefit of European Patent Application No. 17197540.2, filed Oct. 10, 2017, the disclosures of which are incorporated herein by reference in their entirety.

TECHNICAL FIELD

The disclosure relates to a method for performing rotational speed synchronisation of a first transmission component having a first initial rotational speed $\omega\_initial$ with a second transmission component having a second initial rotational speed, so that they rotate with the same final rotational speed $\omega\_final$ during a gear switch from an initial driving gear to a final driving gear in a stepped gear transmission for a hybrid electric or electric drive train having an electric traction motor.

The disclosure also relates to a drive train for a hybrid electric or electric vehicle, wherein the drive train comprising a stepped gear transmission having a plurality of driving gears and at least one mechanical synchroniser, an electric traction motor and a transmission control unit.

Although the disclosure may be described primarily in relation to a car, the disclosure is not restricted to this particular vehicle, but may be equally applied in other types of vehicles where good drivability is desired, such as buses, trucks, motorcycles, rail vehicles, working vehicles, or the like.

BACKGROUND ART

Drive trains for hybrid electric vehicles or pure electric vehicles comprising an automatic stepped gear transmission and an electric traction motor, may depending on the circumstances and/or the specific transmission design be required to perform torque interrupt gear shifts, because a mechanical synchroniser of the transmission must disengage from the previous gear, synchronise with the next gear and subsequently engage and become rotatably connected with the next gear, and no traction torque can be transmitted to the driving wheels during these activities.

Furthermore, the electric traction motor that is drivingly connected to a shaft of the drive train has a relatively large moment of inertia compared with gears and shafts of a conventional transmission of a non-electric drive train. The relatively large inertia of the electric traction motor typically results in increased gear shift time of the transmission in order to preserve the mechanical synchroniser life, but long gear shift time result in in distinct torque interrupt shifts which is an undesirable gear shifting behaviour. Long gear shift times degrade the drivability of a vehicle having such a drive train, since gear shifts at least in electric mode are torque interrupt shifts.

There is thus in the field of hybrid electric vehicles or pure electric vehicles comprising an automatic stepped gear transmission and an electric traction motor, an increasing demand for improved drivability.

Document DE 10 2010 035 776 A1, which comprises a drive train with an automatic stepped transmission and an electric traction motor, discloses a gear shift method that aims at reducing the load on the mechanical synchroniser.

Despite the activities in the field, there is a demand for an improved drivability of the drive trains for hybrid electric vehicles or pure electric vehicles comprising an automatic stepped gear transmission and an electric traction motor.

SUMMARY OF THE DISCLOSURE

A general object of the present disclosure is to provide improved drivability of a drive train for hybrid electric vehicles or pure electric vehicles comprising an automatic stepped gear transmission and an electric traction motor. In particular, an object of the present disclosure is to reduce the torque-interrupt time when performing gear change in an operation mode characterised by low and/or high available power level of an electric storage system, while taking into account relevant parameters, such as mechanical synchroniser performance limits, thereby accomplishing a smoother and generally improved drivability.

This and other objects, which will become apparent in the following, are accomplished by a method for performing rotational speed synchronisation and drive train as defined in the accompanying independent claims. Details of some example embodiments and further optional features are recited in the associated dependent claims.

According to a first aspect of the present disclosure, there is provided a method for performing rotational speed synchronisation of a first transmission component having a first initial rotational speed $\omega\_initial$ with a second transmission component having a second initial rotational speed, so that they rotate with the same final rotational speed $\omega\_final$ during a gear switch from an initial gear to a final gear in a stepped gear transmission for a hybrid electric or electric drive train having an electric traction motor. The method comprises calculating a total frictional work resulting from performing the total rotational speed synchronisation by means of a mechanical synchroniser of the stepped gear transmission only, and if the calculated total frictional work exceeds a maximal frictional work of the mechanical synchroniser, performing rotational speed synchronisation of the first transmission component by means of both the electric traction motor and the mechanical synchroniser.

Furthermore, according to a second aspect of the present disclosure, there is provided a drive train for a hybrid electric or electric vehicle, which drive train comprises a stepped gear transmission having a plurality of gears and at least one mechanical synchroniser, an electric traction motor and a transmission control unit. The transmission control unit is configured to perform rotational speed synchronisation of a first transmission component having a first initial rotational speed $\omega\_initial$ with a second transmission component having a second initial rotational speed, so that they rotate with the same final rotational speed $\omega\_final$ during a gear switch from an initial gear to a final gear by means of calculating a total frictional work resulting from performing the total rotational speed synchronisation by means of the mechanical synchroniser of the stepped gear transmission only, and if the calculated total frictional work exceeds a maximal frictional work of the mechanical synchroniser, performing rotational speed synchronisation of the first transmission component by means of both the electric traction motor and the mechanical synchroniser.

When performing rotational speed synchronisation between a first and a second transmission component, it may be difficult to find an appropriate synchronisation strategy for performing the rotational speed synchronisation. For example, synchronisation by means of the electric traction motor has the advantage of providing a wear-less synchronisation that may be performed rather quickly if sufficient power is available in the electric storage system and the power rating of the electric traction motor is sufficiently large. Another advantage may be the possibility to completely omit the conventional friction cone of the mechanical synchroniser and thereby saving cost. However, electric traction motor control for performing a synchronisation by means of the electric traction motor may be increasingly complex and costly with reduced synchronisation time, and upon low power available in the electric storage system the synchronisation time may be unacceptable long and thereby significantly decrease drivability.

Both the method for performing rotational speed synchronisation according to the first aspect of the present disclosure, and the drive train according to the second aspect of the present disclosure at least partly solves the problem of providing improved drivability by providing reduced torque-interrupt time in connection with gear changes, particularly in, but not limited to, an operation mode characterised by low electric storage system charge level, while taking into account mechanical synchroniser performance limits.

This is realised by comparing a predicted value of a total frictional work resulting from performing the total rotational speed synchronisation by means of a mechanical synchroniser of the stepped gear transmission only, with a maximal frictional work that the mechanical synchroniser withstand. It the check indicates that the predicted value of a total frictional work resulting from performing the total rotational speed synchronisation by means of a mechanical synchroniser of the stepped gear transmission only exceeds the maximal frictional work that the mechanical synchroniser withstand, the method and drive train selects to perform rotational speed synchronisation of the first transmission component by means of both the electric traction motor and the mechanical synchroniser. Thereby, potential damages to the mechanical synchroniser can be avoided while still accomplishing short torque-interrupts.

The method and drive train are configured to judge based on predictions and current conditions which strategy will lead to reduced overall rotational speed synchronization time. The method and drive train ensure that the synchroniser operation stays within its functional limits. If the gear shift friction work exceeds the synchronizer limit, then the prediction algorithm may predict a suitable switch point from synchronisation by means of the electric motor to synchronisation to the mechanical synchroniser.

The method and drive train described above are specifically advantageous when the available power from the electric storage system is relatively low, because then synchronisation by means of the electric traction motor only may become unacceptable long.

For example, the first transmission component may be a mechanical synchroniser and the second transmission component may be an idler gear, or oppositely, depending on transmission design.

In one example embodiment, rotational speed synchronisation of the first transmission component is performed by means of both the electric traction motor and the mechanical synchroniser, either completely sequentially, or partly sequentially and partly overlapping in time, or completely overlapping in time. An overlapping use of the electric traction motor and the mechanical synchroniser may results in a faster synchronisation process, but typically requires more advanced controlling of the output torque of the electric traction motor. A sequential use of the electric traction motor and the mechanical synchroniser, in that order, may typically result in less complicated implementation of the method.

In one example embodiment, the method comprises performing the rotational speed synchronisation of the first transmission component by means of the electric traction motor to larger extent than the mechanical synchroniser in a first half of the rotational speed synchronisation sequence in terms of rotational speed, and performing the rotational speed synchronisation of the first transmission component by means of the electric traction motor to smaller extent than the mechanical synchroniser in a second half of the rotational speed synchronisation sequence in terms of rotational speed. This may be advantageous in terms of less hardware and software requirements for performing the synchronisation by means of the electric traction motor and mechanical synchroniser jointly.

In one example embodiment, the method comprises: if the calculated total frictional work exceeds a maximal frictional work of the mechanical synchroniser, calculating a limit rotational speed that results in 50-100%, specifically 75-100%, of the maximal frictional work of the mechanical synchroniser when rotational speed synchronisation from the limit rotational speed to the final rotational speed is performed by means of both the mechanical synchroniser and the electric traction motor, and subsequently performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of both the mechanical synchroniser and the electric traction motor combined and simultaneously. This embodiment has the advantage that the combined simultaneous synchronisation torque from the electric traction motor and the mechanical synchroniser generally results in a faster synchronisation.

For ensuring that the mechanical synchroniser is free from synchronisation torque at time point of rotational locking of the mechanical synchroniser with the on-coming idler gear the synchronisation torque provided by the electrical traction motor may be stopped a certain time before predicted event of rotational locking. Therefore, said remaining rotational speed synchronisation from the limit rotational speed to the final rotational speed may be performed by means of both the mechanical synchroniser and the electric traction motor combined and partly simultaneously.

In one example embodiment, the method comprises: if the calculated total frictional work exceeds a maximal frictional work of the mechanical synchroniser, calculating a limit rotational speed that results in 50-100%, specifically 75-100%, of the maximal frictional work of the mechanical synchroniser when rotational speed synchronisation from the limit rotational speed to the final rotational speed is performed by means of the mechanical synchroniser only, then performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of the mechanical synchroniser only. This synchronisation strategy is advantageous because it does not require complex and expensive software and hardware.

In one example embodiment, the method further comprises: if the calculated total frictional work does not exceed a maximal frictional work of the mechanical synchroniser, or if the calculated total frictional work does not exceed 70-99%, specifically 80-99%, and more specifically 75-95%, of the maximal frictional work of the mechanical synchroniser, performing the rotational speed synchronisation by means of the mechanical synchroniser only. When the rotational speed difference is within acceptable functional limits of the mechanical synchroniser with respect to heat generation and total frictional work, performing the synchronisation be means of the mechanical synchroniser.

In one example embodiment, the step of calculating the total frictional work is performed while taking into account at least one of the following parameters: mechanical synchroniser engagement force, initial rotational speed, final rotational speed, and inertia of rotating part of electric traction motor. For improved accuracy, all of said parameters should be taken into account. Moreover, also the combined moment of inertia of the masses to be synchronized, and/or torque losses within the transmission such as for example bearing losses, oil churning losses, oil drag losses and oil squeezing losses, may be taken into account for even further improved accuracy.

In one example embodiment, the method further comprises calculating the initial rotational speed of the first transmission component taking into account at least current accelerator pedal position, a shift map, and current gear.

In one example embodiment, the method further comprises calculating the final rotational speed of the first transmission component taking into account at least the initial rotational speed of the first transmission component and a gear ratio of the final driving gear.

In one example embodiment, the method further comprise: if the currently available power in an electric storage system of the hybrid electric or electric drive train is below 25 kW, specifically below 15 kW, and more specifically below 5 kW, then calculating the total frictional work resulting from performing the total rotational speed synchronisation by means of a mechanical synchroniser of the stepped gear transmission only.

The time period for performing synchronisation by means of the electric traction motor only is primarily dependent on the level of available power from the electrical storage system. With relatively high level of available power from the electrical storage system, such as for example at least 30 kW, the time period for performing synchronisation by means of the electric traction motor only tend to be shorter than the time period for performing synchronisation by means of the mechanical synchroniser only, and with relatively low level of available power from the electrical storage system, such as for example less than 20 kW or less than 10 kW, it is not seldom oppositely.

Consequently, by checking the currently available power in the electrical storage system and only proceed to the step of calculating the total frictional work when the currently available power in the electrical storage system is relatively low, one enables a significant reduction in the amount calculations.

For example, if the method just described additionally, prior to the step of calculating the total frictional work, comprises the step of: if the currently available power in an electric storage system of the hybrid electric or electric drive train is not below 25 kW, specifically not below 15 kW, and more specifically not below 5 kW, then performing synchronisation by means of the electric traction motor only, the method would certainly involve less calculations than without said check of the currently available power in an electric storage system.

According to a further aspect of the present disclosure, there is provided a method comprising: calculating a first time period for performing the total rotational speed synchronisation by means of only the electric traction motor, calculating a second time period for performing the total rotational speed synchronisation by means of only a mechanical synchroniser of the stepped gear transmission, if the first synchronisation time period does not exceed the second synchronisation time period, or if the first synchronisation time period does not exceed the second synchronisation time period more than 25%, specifically more than 10%, performing the synchronisation by means of the electric traction motor only.

According to a still a further aspect of the present disclosure, there is provided a drive train for a hybrid electric or electric vehicle, the drive train comprising a stepped gear transmission having a plurality of driving gears and at least one mechanical synchroniser, an electric traction motor, and a transmission control unit. The transmission control unit is configured to calculating a first time period for performing the total rotational speed synchronisation by means of only the electric traction motor, and calculating a second time period for performing the total rotational speed synchronisation by means of only a mechanical synchroniser of the stepped gear transmission. If the first synchronisation time period does not exceed the second synchronisation time period, or if the first synchronisation time period does not exceed the second synchronisation time period more than 25%, specifically more than 10%, the transmission control unit is configured to perform the synchronisation by means of the electric traction motor only.

It may be advantageous to perform the synchronisation by means of the electric traction motor only when this result in a quicker synchronisation time period compared with performing the synchronisation by means of the mechanical synchroniser only. This is specifically relevant in an operation mode characterised by relatively high available power level of an electric storage system, because by analysing and comparing the synchronisation time periods for both synchronisation by mechanical synchroniser only and electrical traction motor only, the method for performing rotational speed synchronisation according to the disclosure at least partly solves the problem of providing improved drivability by providing reduced torque-interrupt time in also in operation mode characterised by relatively high or medium available power levels from the electric storage system.

In certain situations it may even be advantageous to perform the synchronisation by means of the electric traction motor when this results in a synchronisation time period that is 25%, specifically 10%, longer that the synchronisation time period of the mechanical synchroniser, for example when wear and lifetime of the mechanical synchroniser is a parameter to take into account, and not only the shortest synchronisation time period.

In one example embodiment, the step of calculating the first time period is performed while taking into account currently available power in the electric storage system. Currently available power in the electric storage system is one of the most relevant and important parameters for calculating the first time period.

In one example embodiment, the step of calculating the first time period is performed while taking into account also one or more of: a calculation of the available torque from the electric traction motor, the inertia of the rotating parts of the electric traction motor, final rotational speed, and initial rotational speed, and preferably further also the combined moment of inertia of the masses to be synchronized and/or torque losses within the transmission such as for example bearing losses, oil churning losses, oil drag losses and oil squeezing losses.

In one example embodiment, the step of calculating the second time period is performed while taking into account mechanical synchroniser engagement force. The mechanical synchroniser engagement force is one of the most relevant and important parameters for calculating the second time period.

In one example embodiment, the step of calculating the second time period is performed while taking into account also initial rotational speed, final rotational speed, and inertia of rotating part of electric traction motor. Possibly, step of calculating the second time period may be performed while taking into account also one or both of a combined moment of inertia of the masses to be synchronized, and torque losses within the transmission such as for example bearing losses, oil churning losses, oil drag losses and oil squeezing losses.

In one example embodiment, the method further comprises: if the currently available power in an electric storage system of the hybrid electric or electric drive train is above a threshold value of 15 kW, specifically 25 kW, or more specifically 35 kW, then performing the synchronisation by means of the electrical traction motor only, and otherwise calculating said first and second time periods.

This embodiment enables a significant reduction in amount of calculations, because a relatively high available power from the electrical storage system tend to results in a shorter time period for performing the synchronisation by means of the electric traction motor only, than by performing the synchronisation by means of the mechanical synchroniser only. Hence, in these situations, the calculations of the first and second time periods would nevertheless primarily indicate that the first time period is shorter than the second time period, and the method would nevertheless end up with performing the synchronisation by means of the electrical traction motor only.

In one example embodiment, the calculations of the first time period and the second time period are performed prior to the calculation of the total frictional work, and if the first time period exceeds the second time period, or if the first synchronisation time period exceeds the second time period by more than 25%, specifically by more than 10%, then calculating said total frictional work.

This embodiment provides improved drivability and short torque-interrupts for all levels of currently available power from the electrical storage system. For example if the currently available power from the electrical storage system is high the first time period will be shorter than the second time period and the synchronisation will be performed by means of the electrical traction motor with a very short torque-interrupt. On the other hand, if the currently available power from the electrical storage system is low, the second time period will be shorter and calculation of the total frictional work will be performed for checking whether the there is a risk for overheating or other damage to the mechanical synchroniser, and depending on the result, synchronisation will be performed by means of the mechanical synchroniser only, or in combination with the electrical traction motor, with a minimal or at least very short torque-interrupt.

In one example embodiment, the stepped gear transmission is a dual clutch transmission having a first friction clutch drivingly connected with a first shaft carrying a first set of meshing gears and a second friction clutch drivingly connected with a second shaft carrying a second set of meshing gears, wherein the electric traction motor is drivingly connected to one of the first and second shafts, or an automated manual transmission with the electric traction motor drivingly connected to a shaft of the transmission. At least these two types of transmissions experience torque interrupt during gear changes, wherein reduced synchronisation time generally results in improved drivability of the vehicle.

In one example embodiment, the electric traction motor is a permanent magnet synchronous motor, or an induction motor, or a switched reluctance motor, or a DC motor. The permanent magnet synchronous motor is particularly relevant due to its high output torque capacity.

In one example embodiment, the transmission control unit is configured to perform the rotational speed synchronisation by means of the electric traction motor to larger extent than the mechanical synchroniser in a first half of the rotational speed synchronisation sequence in terms of rotational speed, and performing the rotational speed synchronisation of the first transmission component by means of the electric traction motor to smaller extent than the mechanical synchroniser in a second half of the rotational speed synchronisation sequence in terms of rotational speed. This synchronisation strategy may be advantageous because the risk for synchronisation damages is reduced by when no synchronisation torque is supplied to the mechanical synchroniser at the final part of the synchronisation sequence.

In one example embodiment, if the calculated total frictional work exceeds a maximal frictional work of the mechanical synchroniser, the transmission control unit is configured to calculating a limit rotational speed that results in 50-100%, specifically 75-100%, of the maximal frictional work of the mechanical synchroniser when rotational speed synchronisation from the limit rotational speed to the final rotational speed is performed by means of both the mechanical synchroniser and the electric traction motor, and subsequently performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of both the mechanical synchroniser and the electric traction motor. This method is advantageous because the combined synchronisation torque from the electric traction motor and the mechanical synchroniser generally results in a faster synchronisation.

In one example embodiment, if the calculated total frictional work exceeds a maximal frictional work of the mechanical synchroniser, the transmission control unit is configured to calculating a limit rotational speed that results in 50-100%, specifically 75-100%, of the maximal frictional work of the mechanical synchroniser when rotational speed synchronisation from the limit rotational speed to the final rotational speed is performed by means of the mechanical synchroniser only, and subsequently performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of the mechanical synchroniser only. This synchronisation strategy is advantageous because it does not require complex and expensive software and hardware.

In one example embodiment, the transmission control unit further is configured for, if the calculated total frictional work does not exceed a maximal frictional work of the mechanical synchroniser, or if the calculated total frictional work does not exceed 70-99%, specifically 80-99%, of the maximal frictional work of the mechanical synchroniser, performing the rotational speed synchronisation by means of the mechanical synchroniser only. Mechanical synchronisation by means of the mechanical synchroniser is often very quick and easily controlled.

In one example embodiment, the transmission control unit further is configured for performing the following steps, prior to step of calculating the total frictional work: calculating a first time period for performing the total rotational speed synchronisation by means of only the electric traction motor taking into account current available power in the electric storage system, calculating a second time period for performing the total rotational speed synchronisation by means of only a mechanical synchroniser of the stepped gear transmission, and if the first synchronisation time period does not exceed the second synchronisation time period, or if the first synchronisation time period does not exceed the second synchronisation time period more than 25%, specifically more than 10%, then performing the synchronisation by means of the electric traction motor only.

In one example embodiment, the transmission control unit is configured to performing the calculations of the first time period and the second time period prior to the calculation of the total frictional work, and if the first synchronisation time period exceeds the second synchronisation time period, or if the first synchronisation time period exceeds the second synchronisation time period more than 25%, specifically more than 10%, calculating said total frictional work. This embodiment provides improved drivability and short torque-interrupts for all levels of currently available power from the electrical storage system.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION OF EXAMPLE EMBODIMENTS OF THE DISCLOSURE

Figure 1:
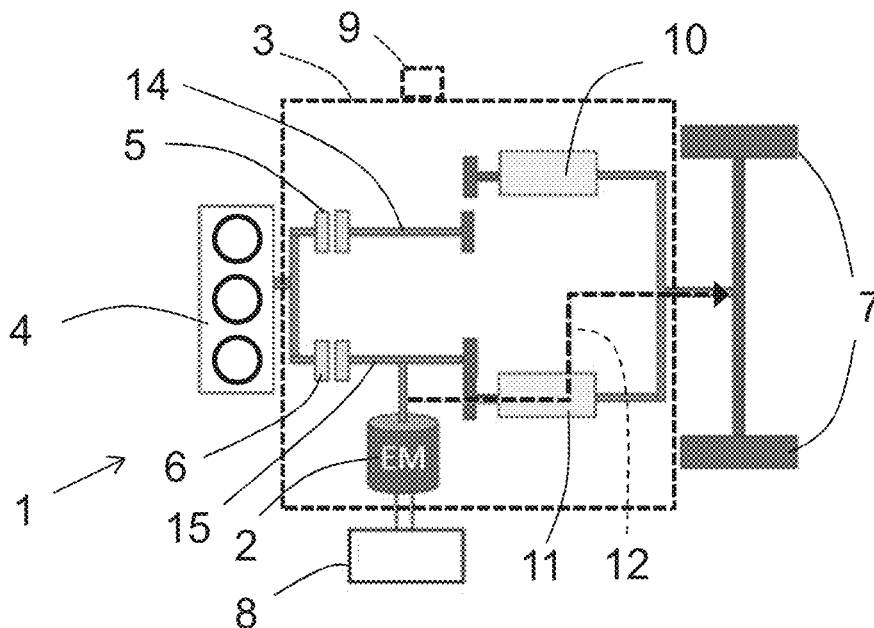
FIG. 1 schematically illustrates a hybrid electric drive train with a dual clutch transmission, FIG. 2 schematically shows a hybrid electric drive train with an automated manual transmission, FIG. 3 schematically shows an electric drive train with an automated manual transmission.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

FIG. 1 shows a first example embodiment of a hybrid electric drive train 1 for a vehicle according to the present disclosure. The specific example embodiment relates to a parallel hybrid electric vehicle with a combustion engine 4 and an electric traction motor 2 integrated into a stepped gear transmission 3 in form of a dual clutch transmission.

The electric traction motor 2 may be a permanent magnet synchronous motor, or an induction motor, or a switched reluctance motor, or a DC motor.

The drive train 1 can provide traction force to the driving wheels 7 by means of the combustion engine 4 only, or by means of the electric traction motor 2 only, or by a combination of the combustion engine 4 and the electric traction motor 2. The drive train 1 further comprises an electric storage system 8 with associated electrical storage management system and electric traction motor control and a transmission control unit 9.

The electrical storage system 8 may for example comprise one or more batteries and/or one or more capacitors, such as for example super capacitors. The disclosure will hereinafter refer mainly to the electrical storage system 8 in form of a battery.

The transmission control unit 9 is preferably an electronic control device having a pre-programmed digital computer or processor, control logic, memory used to store data, and at least one I/O peripheral. The control logic includes a plurality of logic routines for monitoring, manipulating, and generating data. The transmission control unit 9 controls the actuation of the dual clutch transmission 3 and the mechanical synchronisers according to the principles of the present disclosure.

The dual clutch transmission 3 is a multi-speed transmission that uses a combination of two friction clutches 5, 6 and a plurality of mechanical synchronisers (not showed) to achieve power-shifts by alternating between the first and second friction clutches 5, 6.

When a first friction clutch 5 is engaged and transmitting propulsion torque from a prime mover, such as the combustion engine 4, to the wheels 7 of the vehicle via a first driving gear from a first set of driving gears 10, such as for example one of driving gears 1, 3, 5, 7, the second friction clutch 6 is disengaged and a mechanical synchroniser (not showed) associated with a second driving gear from a second set of driving gears 11, such as for example one of driving gears 2, 4, 6, has time to disengage from the previous driving gear, to synchronise and become pre-selected with the next driving gear prior to actually making the power-shift. Consequently, when the next gear change shall take place, the first friction clutch 5 becomes disengaged simultaneously as the second friction clutch 6 becomes engaged, such that power-shifting can occur without interruption of torque flow from the combustion engine 4 to the driving wheels 7 and a high level of drivability is provided.

The electric traction motor 2 may for example by drivingly connected with one of the first and second input shafts 14, 15 of the dual clutch transmission 3.

The mechanical synchronisers of the dual clutch transmission 3 are operable to selectively couple individual idler gears within the plurality of gear sets 10, 11 to one of a plurality of shafts (not showed). The plurality of shafts may for example include layshafts, countershafts, sleeve and centre shafts, reverse or idle shafts, or the like.

Each mechanical synchroniser is located either adjacent a single idler gear or between adjacent pairs of idler gears. Each mechanical synchroniser, when being pushed axially with high engagement force towards an idler gear by means of an actuator, synchronizes the speed of the idler gear to that of a the shaft on which the mechanical synchroniser is rotationally locked by means a friction surface, and subsequently locks the idler gear with the shaft by means of a positive clutch, such as a dog clutch of the mechanical synchroniser.

The design of the dual clutch transmission enables power-switching, i.e. switching driving gears without torque interrupt, by means of the first and second friction clutches 5, 6 and their associated gear sets 10, 11.

However, when the drive train 1 in FIG. 1 is operated in a pure electrical mode with the combustion engine shut off, both friction clutches 5, 6 may be put in an disengaged position and only the second gear set 11 is available for transmission of propulsion from the electric traction motor 2 to the wheels 7, as depicted by a propulsion path 12 included in FIG. 1. Consequently, power-shifts are no longer available and a certain level of torque interrupt cannot be avoided. It is therefore an object of the disclosure, for providing improved drivability of the vehicle, to provide a method for synchronising the transmission components in order to reduce or even minimize the torque interrupt phase occurring in connection with gear switching.

This object is at least partly accomplished by performing rotational speed synchronisation of a first transmission component having a first initial rotational speed $\omega\_initial$ with a second transmission component having a second initial rotational speed, so that they rotate with the same final rotational speed $\omega\_final$, by means of the electric traction motor 2 and the mechanical synchroniser jointly to perform the synchronisation of the transmission during gear changes. Thereby, the synchronisation time period can be reduced, and the torque interrupt is less noticeable for a driver or passenger of the vehicle.

Due to the fact that the second transmission component typically is permanently rotatably connected with the driving wheels of the vehicle, and the relatively large mass of the vehicle, the second initial rotational speed of the second transmission component typically is identical with the final rotational speed of the second transmission component.

Figure 2:
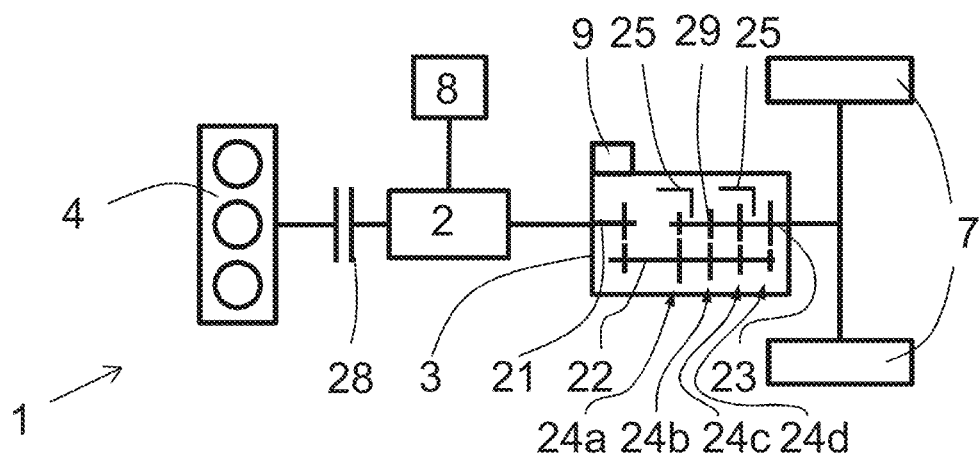

The present disclosure can advantageously also be used for providing improved drivability of a drive train 1 having a transmission 3 in form of automated manual transmission, as schematically illustrated FIG. 2. An automated manual transmission 3 includes only one friction clutch, as conventional manual transmissions. Therefore, power-shifts are never possible and a certain level of torque interrupt is part of the driving characteristic of an automated manual transmission. However, for providing improved drivability of an automated manual transmission, the drive train can be controlled to reduce the time length of a torque interrupt phase occurring in connection with gear switching by applying the features of the disclosure.

FIG. 2 illustrates schematically the hybrid electric drive train comprising a combustion engine 4, an electric traction motor 2, a battery 8 with associated battery management and electric traction motor control, a clutch 28 enabling disconnection of the combustion engine 4, and an automated manual transmission 3 with an input shaft 21, a layshaft 22, and an output shaft 23. Four driving gears 24a-d are illustrated and two individual mechanical synchronisers 25. Each driving gear is made up of two gears, i.e. gear wheels, which are in constant mesh with each other and which determine the gear ratio of each specific driving gear. In the example transmission 3 of FIG. 2, the gears of the layshaft 22 are permanently rotationally fixed to the layshaft 22, and the gears of the output shaft 23 are idling gears, i.e. gears that are freely rotatable on the output shaft 23 by means of a needle bearing or the like. The idler gears are sometimes also referred to as loose gears.

Each mechanical synchroniser 25 is rotationally secured to, and axially slidable on, the output shaft 23, and may be selectively engaged with one idler gear at a time via dog-teeth for temporary rotational locking of an idler gear to the output shaft 23. The electric traction motor 2 and the mechanical synchroniser 25 jointly perform the synchronisation of the transmission during gear changes. The disclosure is of course not limited to this specific example design of the transmission 3.

Figure 3:
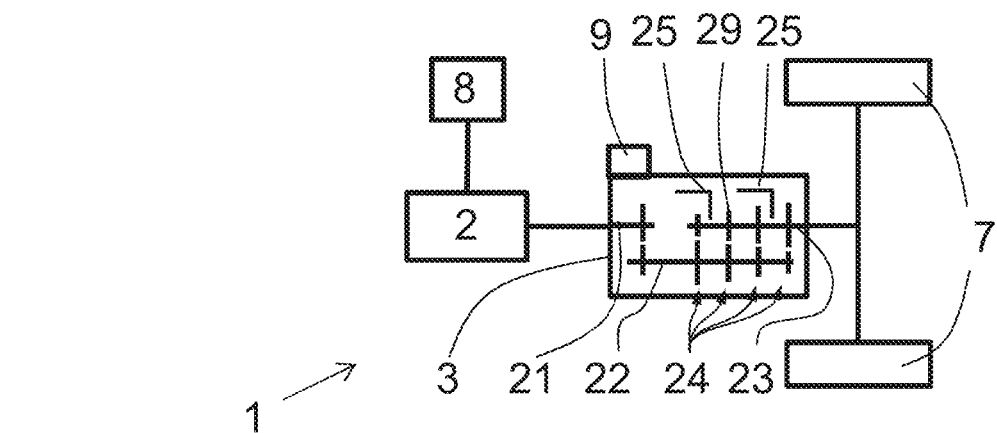

Finally, as a further alternative, the disclosure can advantageously be implemented for improved drivability of a pure electric drive train 1 having transmission 3 in form of automated manual transmission 3, as schematically illustrated FIG. 3. The functionality and advantages of the disclosure as described with reference to FIG. 2 is equally applicable for this drive train 1.

The method according to the disclosure aims at providing good drivability by keeping the torque interrupts short, and by performing quick synchronisation the gear change may be performed quickly, such that the traction torque from the electric traction motor 2 can be re-established quickly.

Synchronisation may be performed by means of the electric traction motor 2 only, or by the mechanical synchroniser 25 only, or by a combination of the electric traction motor 2 and mechanical synchroniser 25.

Depending on the amount of power available in the electric battery 8, the available power from the electric traction motor 2, the performance limit of the mechanical synchroniser 25, synchronisation may be optimised for providing a short synchronisation time within the boundaries of the performance limits of the mechanical synchroniser 25.

Figure 4:
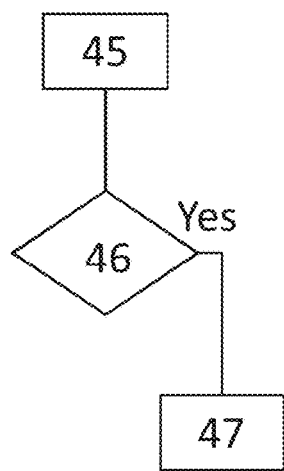
FIG. 4 shows a flow chart of a first example embodiment of the present disclosure.

FIG. 4 schematically illustrates an example embodiment of the method for performing rotational speed synchronisation of a first transmission component having an initial rotational speed ω_initial with a second transmission component having a final rotational speed ω_final during a gear switch from an initial driving gear to a final driving gear, in an operation mode where the available synchronisation torque from the electric traction motor 2 is relatively low compared with the synchronisation torque available from the mechanical synchroniser 25.

The method comprises a step 45 of calculating a total frictional work resulting from performing the total rotational speed synchronisation by means of a mechanical synchroniser 25 of the stepped gear transmission only. This calculation is based on using the maximal available engagement force of the mechanical synchroniser 25 over the complete synchronisation phase. In other word, in step 45 the method involves prediction of the total frictional work that would result if the total rotational speed synchronisation would be performed by means of the mechanical synchroniser 25 only.

Thereafter the method checks in step 46 whether the predicted total frictional work exceeds a maximal frictional work of the mechanical synchroniser 25.

If yes, i.e. if the predicted total frictional work exceeds a maximal frictional work $W_{lim}$ of the mechanical synchroniser 25, the method in step 47 performs rotational speed synchronisation of the first transmission component by means of both the electric traction motor 2 and the mechanical synchroniser 25.

The method in step 47 may perform the rotational speed synchronisation of the first transmission component by means of both the electric traction motor 2 and the mechanical synchroniser 25, either completely sequentially, or partly sequentially and partly overlapping in time, or completely overlapping in time.

The mechanical synchroniser 25 is rotatably fixed to, and axially slidable along, a shaft of the transmission 3. When an axial engagement force is actuated on the mechanical synchroniser 25 a conical frictional surface of the mechanical synchroniser is arranged to engage a corresponding conical surface of an idler gear that is freely rotatably on the shaft, such that the mechanical synchroniser and gear becomes synchronised in terms of rotational speed, i.e. the rotate with the same speed. When the frictional surfaces of the mechanical synchroniser and gear are pressed together with a high force, such for example in the range of 500-1500 Newton, heat is generated. The amount of heat depends on factors such as the initial difference in rotational speed between the mechanical synchroniser and gear, as well as the combined moment of inertia of the masses to be synchronized, whose speed should adapted to the speed of the second transmission component.

For example, in the example drive train layouts of FIG. 2, the mechanical synchroniser 25 is rotatably fixed to the output shaft 23 of the transmission 3, and upon gear change from for example first driving gear 24a to second driving gear 24b, the idler gear 29 of the second driving gear 24b, the layshaft 22 and all gears attached thereto, the input shaft 21 and all gear attached thereto, and the rotating part of the electric traction motor 2. Out of these components, the inertia of the rotor of the electric traction motor 2 is typically most significant.

If the mechanical synchroniser 25 is engaged with a relatively high force, the initial difference in rotational speed is relatively high, and the total inertia of the rotating parts to be synchronised in speed is relatively large, there is a risk of overheating of the mechanical synchroniser. Overheating may cause excessive wear or complete malfunction of the friction surface of the mechanical synchroniser.

Mechanical synchronisers are therefore provided with maximal frictional work $W_{lim}$ of the mechanical synchroniser that is typically provided by the manufacturer of the mechanical synchroniser, or that may be determined otherwise. The maximal frictional work $W_{lim}$ of the mechanical synchroniser 25 may be a constant predetermined value. Alternatively, the maximal frictional work $W_{lim}$ of the mechanical synchroniser 25 may be a variable value that takes into account aspects like current temperature, time since most recent synchronisation event, the frictional work of the most recent synchronisation event, ambient conditions, or the like.

For avoiding damage of the mechanical synchroniser 25 the method thus checks in step 46 whether the calculated total frictional work exceeds a maximal frictional work $W_{lim}$ of the mechanical synchroniser. If yes, the method in step 47 performs rotational speed synchronisation of the first transmission component by means of both the electric traction motor and the mechanical synchroniser. By using torque also from the electric traction motor for synchronisation less torque is required from the mechanical synchroniser, such that reduced frictional work is put on the mechanical synchroniser and the risk for damage of the mechanical synchroniser is avoided.

In other word, by performing the rotational speed synchronisation of the first transmission component by means of both the electric traction motor 2 and the mechanical synchroniser 25 in step 47 the additional synchronisation torque of the electric traction motor 2 can be utilised for performing the synchronisation relatively fast and without exceeding the maximal frictional work $W_{lim}$ of the mechanical synchroniser 25.

The step 45 involving calculation the total frictional work may for example be performed while taking into account at least one of the following, and preferably all, parameters: mechanical synchroniser engagement force, initial rotational speed ω_initial, final rotational speed ω_final, and inertia of rotating part of electric traction motor. For even better accuracy, a combined moment of inertia of the masses to be synchronized is taken into account.

Calculation the total frictional work may for example be performed by means of the following equation:

$$W = \frac{0.5 * (J_{red} * \Delta\omega^2 - T_D * \Delta\omega * t_s)}{A}, \quad \text{Equation 1}$$

wherein

W=Total frictional work, $J_{red}$=Combined moments of inertia of the masses to be synchronized, such as electric traction motor and associated rotating parts of the transmission (shafts, gears), Δω=Total difference in rotational speed (ω_initial−ω_final) of transmission component that should have its rotational speed adapted, $T_D$=Drag torque, ts=Slipping time, and A=Gross frictional surface area of cone clutch of mechanical synchroniser The slipping time ts may be calculated by the following steps:

1. Calculate relative velocity $\Delta\omega = \omega_{initial} - \omega_{final}$
2. Calculate $T_{cone} = n_c F_{axial} R \mu \div \sin \alpha$ These parameters are friction clutch related constants, except $F_{axial}$ which represents the engagement force of the mechanical synchroniser.

3. Calculate $J_{red}$ $J_{red}$=Combined moments of inertia of the masses to be synchronized, such as electric traction motor and associated rotating parts of the transmission (shafts, gears), 4. Calculate rotational acceleration $\alpha_{Jed} = (T_{cone} - T_d) \div J_{red}$ $T_D$=Drag torque, 5. Calculate synchronization time $t_s = (\omega_s - \omega_g) \alpha_{Jred}$ Equation 2

With information about both the maximal frictional work $W_{lim}$ that is allowed for the specific mechanical synchroniser and the total frictional work W resulting from adapting the speed of the first transmission component from the initial rotational speed ω_initial to the final rotational speed ω_final, comparison of these values will directly inform whether synchronisation can be performed with the mechanical synchroniser only while avoiding overheating, which is the case when $W_{lim} > W$.

For determining initial rotational speed ω_initial and final rotational speed ω_final of the first transmission component the following can be applied. If the vehicle is under acceleration, the initial rotational speed ω_initial of the first transmission component is still not known. For determining the initial rotational speed ω_initial that will exist during the coming gear change, the method may use a shift map of the transmission 3 for determining when the transmission will initiate a gear change, and thereby the initial rotational speed ω_initial of the first transmission component may be determined.

The shift map of the transmission determines at what rotational speed (ω_initial) the gear shift will take place, depending on the accelerator pedal position and current driving gear.

The method further involves calculating the final rotational speed ω_final of the first transmission component, i.e. the rotational speed of the first transmission component after the synchronisation is completed. This depends on the gear ratio of the driving gear to which the transmission will change to, which herein is referred to as the final driving gear, as well as information related to the speed of the vehicle at time of the gear change, which information is derivable from the initial rotational speed ω_initial of the first transmission component at time of the gear change. It is assumed that the vehicle travels with constant speed during the gear shift.

According to a further example embodiment, the method may in step 47 include performing the rotational speed synchronisation of the first transmission component by means of the electric traction motor 2 to larger extent than the mechanical synchroniser 25 in a first half 81 of the rotational speed synchronisation sequence in terms of rotational speed, and performing the rotational speed synchronisation of the first transmission component by means of the electric traction motor 2 to smaller extent than the mechanical synchroniser 25 in a second half 82 of the rotational speed synchronisation sequence in terms of rotational speed.

The mechanical synchroniser 25 must be torque free at time point of engagement of the dog teeth of the mechanical synchroniser 25 with corresponding teeth of the idler gear for avoiding relative speed therebetween, which relative speed could damage the dog teeth. Moreover, the control of the electric traction motor 2 for synchronisation purpose is increasingly demanding in terms of hardware and software when synchronisation torque of the electric traction motor 2 is to be provided in an intermediate section of the synchronisation sequence. Therefore, it is cost-efficient to primarily use the electric traction motor 2 for synchronisation in the first half 81 of the synchronisation sequence, when the relative speed is still large, and the primarily use the mechanical synchroniser 25 in the second and end half 82 for ensuring that the mechanical synchroniser 25 is torque free at time of positive engagement of the dog teeth.

According to a further example embodiment, the method may in step 47 include first calculating a limit rotational speed ω_lim that results in 50-100%, specifically 75-100%, of the maximal frictional work of the mechanical synchroniser when rotational speed synchronisation from the limit rotational speed ω_lim to the final rotational speed ω_final is performed by means of both the mechanical synchroniser 25 and the electric traction motor 2, and subsequently performing a two-step synchronisation sequence comprising first performing rotational speed synchronisation from the initial rotational speed ω_initial to the limit rotational speed ω_lim by means of the electric traction motor 2 only, and thereafter performing the remaining rotational speed synchronisation from the limit rotational speed ω_lim to the final rotational speed ω_final by means of both the mechanical synchroniser 25 and the electric traction motor 2.

By calculating a limit rotational speed ω_lim that results in 50-100%, specifically 75-100%, of the maximal allowable frictional work of the mechanical synchroniser 25, the efficiency factor of the mechanical synchroniser 25 can be selected. For example, when calculating a limit rotational speed ω_lim that results 100% of the maximal frictional work $W_{lim}$ of the mechanical synchroniser 25, the mechanical synchroniser 25 will be utilised to its maximum capacity, such that the synchronisation may be performed more quickly.

Moreover, by performing the rotational speed synchronisation from the limit rotational speed ω_lim to the final rotational speed ω_final by means of both the mechanical synchroniser 25 and the electric traction motor 2 in combination and partly simultaneously, the synchronisation torque of both units are used jointly for further reduced synchronisation time.

Figure 7:
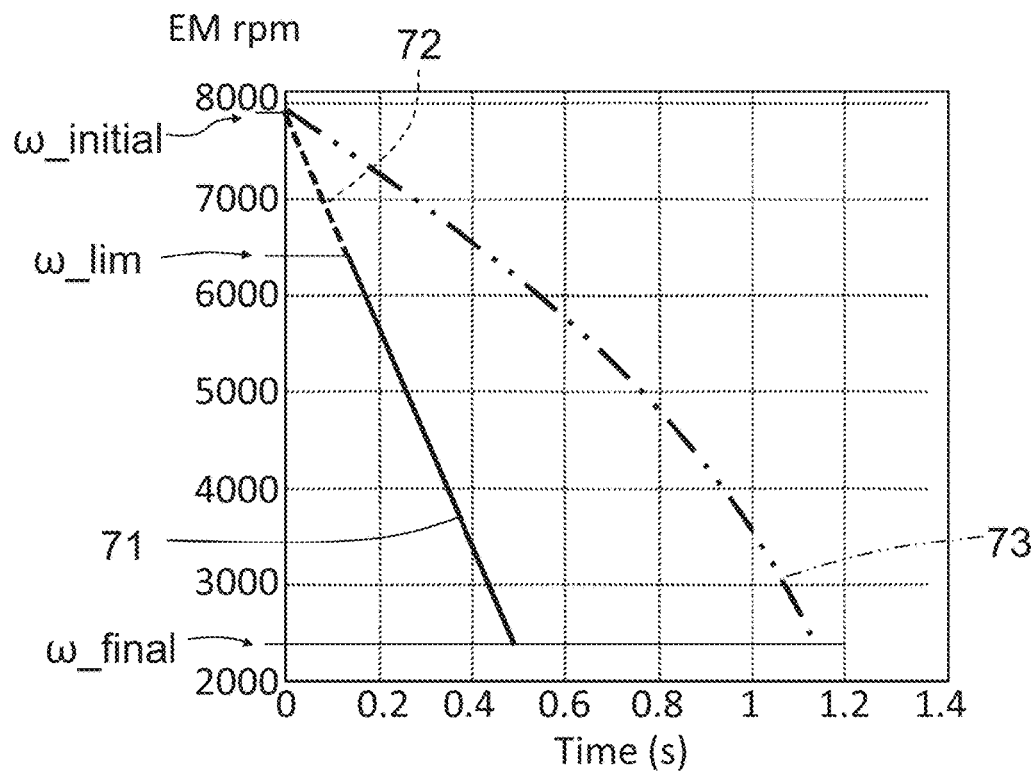
FIG. 7 shows a graph of a speed synchronisation of a first transmission component over time by means of either the mechanical synchroniser only or the electric traction motor only.
Figure 8:
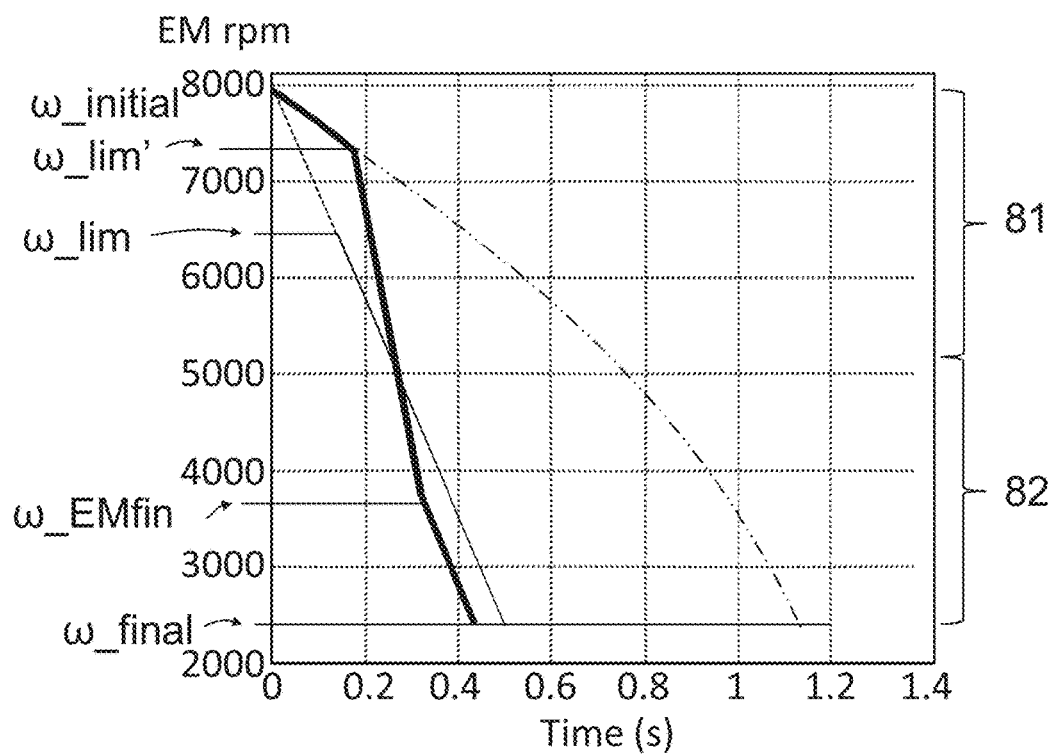
FIG. 8 shows a graph of a speed synchronisation of a first transmission component over time by means of a first example synchronisation strategy according to the disclosure.

An example embodiment of combined rotational speed synchronisation means of the electric traction motor 2 the synchronisation torque is showed with reference to FIGS. 7 and 8. FIG. 7 illustrates schematically the rotational speed of the first transmission component on the Y-axis in terms of rotation per minute (rpm) of the electric traction motor, and the time for performing the synchronisation on the X-axis in term is seconds.

In the specific example, the initial rotational speed ω_initial is about 7900 rpm and the final rotational speed ω_final is about 2400 rpm. The straight line 71 represents change of rotational speed of the first transmission component over time during a synchronisation sequence by means of only mechanical synchroniser 25, and the limit rotational speed ω_lim of about 6500 rpm represents the maximal frictional work of the mechanical synchroniser when applied from the limit rotational speed ω_lim to the final rotational speed ω_final.

In other words, if the mechanical synchroniser 25 is applied at the limit rotational speed ω_lim the maximal allowable frictional work $W_{lim}$ of the mechanical synchroniser is reached when the first transmission component is fully synchronised, i.e. at the final rotational speed ω_final. The dotted section 72 of line 71 thus represents a synchronisation phase that cannot be performed by means of the mechanical synchroniser without overheating or otherwise exceeding the performance limit of the mechanical synchroniser.

Note that the position of the dotted section 72 along the straight line 71 does not indicate where in the synchronisation phase the overheating would take place, but merely the proportion of the total synchronisation that cannot be handled by the mechanical synchroniser 25 without going outside its functional performance limits. In fact, since the synchronisation starts at ω_initial at time zero the actual overheating of the mechanical synchroniser 25 would occur at the end of the second half 82 of the synchronisation sequence.

The slightly curved dash-dot-dot line 73 represents change of rotational speed of the first transmission component over time during a synchronisation sequence by means of only the electric traction motor 2.

FIG. 8 illustrates schematically an example solution for synchronising the mechanical synchroniser with the oncoming idler gear by rotational speed synchronisation by means of the electric traction motor 2 and the mechanical synchroniser 25 jointly. First a new limit rotational speed ω_lim' is calculated that results in for example 90% of the maximal frictional work $W_{lim}$ of the mechanical synchroniser 25 when rotational speed synchronisation from the new limit rotational speed ω_lim' to the final rotational speed ω_final is performed by means of the mechanical synchroniser 25 and by additionally applying synchronisation torque from the electric traction motor 2 in for example 75% of the range from the new limit rotational speed ω_lim' to the final rotational speed ω_final. This result in a new limit rotational speed ω_lim' of about 7400 rpm, wherein synchronisation torque from the electric traction motor 2 will be applied from the new limit rotational speed ω_lim' to about 3700 rpm, which corresponds to an electric traction motor final rotational speed ω_EMfin.

According to this example embodiment, the synchronisation sequence is performed as a two-step synchronisation sequence comprising first performing rotational speed synchronisation from the initial rotational speed ω_initial to the new limit rotational speed ω_lim' by means of the electric traction motor 2 only, and thereafter performing rotational speed synchronisation from the new limit rotational speed ω_lim' to the electric traction motor final rotational speed ω_EMfin of about 3700 rpm by the electric traction motor 2 and mechanical synchroniser 25 jointly, and finally performing rotational speed synchronisation from the electric traction motor final rotational speed ω_EMfin to the final rotational speed ω_final by means of the mechanical synchroniser 25 only.

The electric traction motor 2 is thus used for rotational speed synchronisation from the initial rotational speed ω_initial to the electric traction motor final rotational speed ω_EMfin, and the mechanical synchroniser is used for rotational speed synchronisation from new limit rotational speed ω_lim' to the final rotational speed ω_final. The rotational speed synchronisation will thus be performed by means of the electric traction motor 2 only in a first phase of the synchronisation sequence, by means of the electric traction motor 2 and mechanical synchronisers 25 jointly in an intermediate phase of the synchronisation sequence, and by means of the mechanical synchroniser 25 only in a final phase of the synchronisation sequence.

This synchronisation method results in a synchronisation time period of about 0.45 seconds compared with about 1.1 seconds if the synchronisation would have been performed by means of the electrical traction motor only.

Alternatively, depending on the specific circumstances with respect to available power from the battery 8, the performance limit of the mechanical synchroniser 25, and the maximal synchronisation torque available from the mechanical synchroniser 25, the new limit rotational speed ω_lim' may be identical with the initial rotational speed ω_initial. In such a situation the rotational speed synchronisation will be performed by means of the electric traction motor 2 and mechanical synchroniser 25 jointly in a first phase of the synchronisation sequence that extends from with the initial rotational speed ω_initial to the electric traction motor final rotational speed ω_EMfin, and by means of the mechanical synchroniser 25 only in a final phase of the synchronisation sequence that extends from the electric traction motor final rotational speed ω_EMfin to the final rotational speed ω_final.

The final phase may be of varying length. In certain situations the length of the final phase may for example corresponds to the final 1-10% of the total synchronisation sequence.

Figure 10:
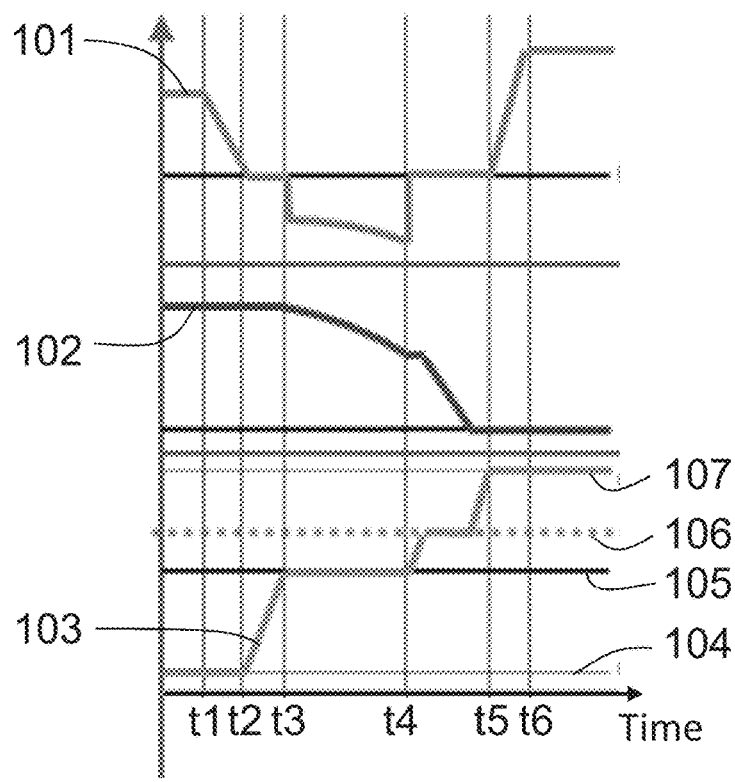
FIG. 10 shows details of the various parameters over time when performing the synchronisation strategy illustrated in FIG. 9.
Figure 9:
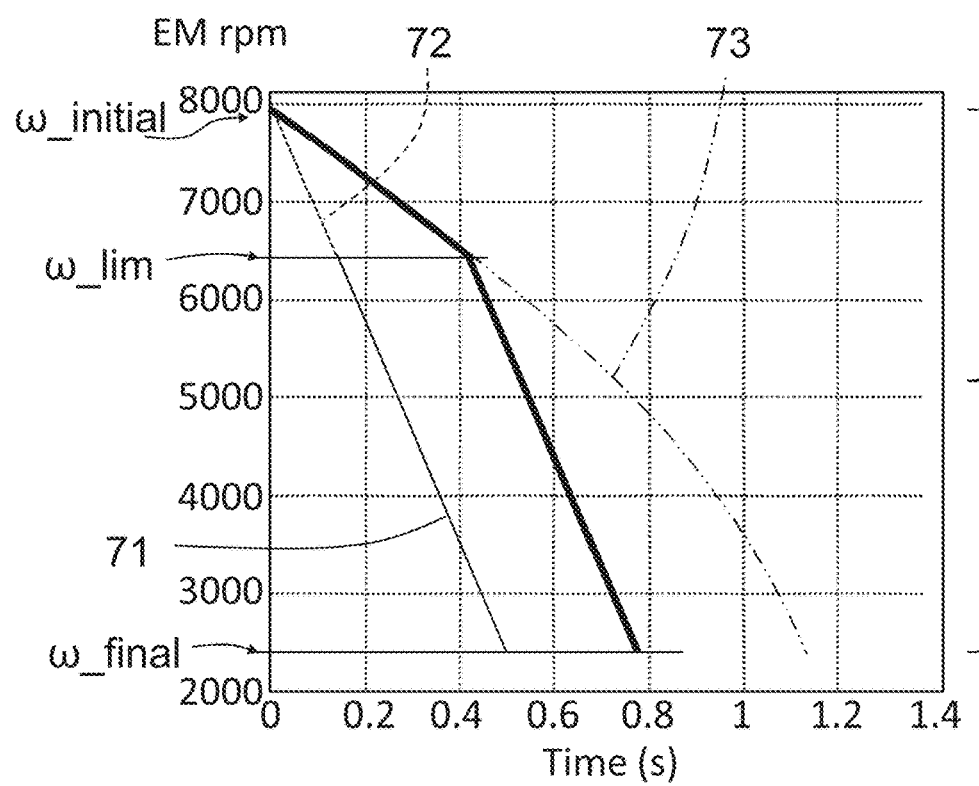
FIG. 9 shows a graph of a speed synchronisation of a first transmission component over time by means of a second example synchronisation strategy according to the disclosure.

An alternative example embodiment of combined rotational speed synchronisation by means of the electric traction motor 2 and the mechanical synchroniser 25 is showed with reference to FIGS. 9 and 10. According to this example embodiment, a less complicated combined synchronisation sequence is applied, in which the electric traction motor 2 and mechanical synchroniser 25 are used sequentially, in that order.

The method comprises calculating a limit rotational speed ω_lim that results in for example 50-100%, specifically 75-100%, of the maximal frictional work $W_{lim}$ of the mechanical synchroniser 25 when rotational speed synchronisation from the limit rotational speed ω_lim to the final rotational speed ω_final is performed by means of the mechanical synchroniser 25 only, and subsequently performing a two-step synchronisation sequence comprising first performing rotational speed synchronisation from the initial rotational speed ω_initial to the limit rotational speed ω_lim by means of the electric traction motor 2 only, and thereafter performing the remaining rotational speed synchronisation from the limit rotational speed ω_lim to the final rotational speed ω_final by means of the mechanical synchroniser 25 only. The hardware and software requirements for this synchronisation strategy is smaller compared with the approach described with reference to FIGS. 7 and 8, but also less efficient in terms of providing high drivability by short synchronisation time.

FIG. 9 schematically illustrates a straight line 71 representing change of rotational speed of the first transmission component over time during a synchronisation sequence by means of only mechanical synchroniser 25, and the slightly curved dash-dot-dot line 73 representing change of rotational speed of the first transmission component over time during a synchronisation sequence by means of only the electric traction motor 2, similar as described with reference to FIGS. 7 and 8.

Since the mechanical synchroniser 25 receives no simultaneous assistance from the electric traction motor 2 for the synchronisation the limit rotational speed ω_lim is not recalculated.

According to this example embodiment, the synchronisation sequence is performed as a two-step synchronisation sequence comprising first performing rotational speed synchronisation from the initial rotational speed ω_initial to the limit rotational speed ω_lim by means of the electric traction motor 2 only, and thereafter performing the remaining rotational speed synchronisation from the limit rotational speed ω_lim to the final rotational speed ω_final by means of the mechanical synchroniser 25 only.

This synchronisation method results in a synchronisation time period of about 0.79 seconds compared with about 1.1 seconds if the synchronisation would have been performed by means of the electrical traction motor only.

This example embodiment is further explained by means of FIG. 10, which shows electric traction motor torque 101, rotational speed difference 102 between the mechanical synchroniser 25 and the on-coming idler gear, and mechanical synchroniser position 103 over time of the gear shift.

Before time t1 the vehicle is travelling at constant speed on an initial driving gear, for example driving gear two in a dual clutch transmission 3 as showed in FIG. 1, having both friction clutches constantly open and operating in an electric mode. The traction torque 101 for driving the vehicle is constant and positive and provided by the electric traction motor 2. The dog teeth of the mechanical synchroniser 25 are in an engaged position 104 with the idler gear of driving gear two, such that traction torque can be transmitted from the second input shaft 15 to the engaged second idler gear and further to an output shaft of the transmission 3.

At time t1 the gear change sequence is started by ramping down traction torque 101 from the electric traction motor 2.

At time t2 the traction torque from the electric traction motor 2 reaches zero and the mechanical synchroniser 25 is pushed axially by means of an actuator to disengage the mechanical synchroniser 25 from the second idler gear.

At time t3 the mechanical synchroniser 25 has reached its neutral position 105, in which it is not rotationally connected to any idler gear, and rotational speed synchronisation by means of the electric motor 2 only is initiated. The traction torque 101 provided by the electric traction motor 2 is negative, because the rotational speed of the mechanical synchroniser must be reduced and synchronised with the rotational speed of the next fourth idler gear, which has a lower rotational speed than the second idler gear.

Between time t3 and t4 the rotational speed difference 102 between the fourth idler gear and the mechanical synchroniser 25 gradually decreases due to the synchronising torque supplied by the electric traction motor 2, and the slope of the decrease depends on the available torque 101 from the electric traction motor 2.

At time t4 a zero torque request is sent to the electric traction motor control unit and upon receiving a confirmation the actuator of the mechanical synchroniser starts pushing the mechanical synchroniser 25 towards the on-coming fourth idler gear. Short thereafter the mechanical synchroniser reaches a blocking position 106, in which the friction cone of the mechanical synchroniser 25 starts to engage the fourth idler gear with a force of for example about 500-1500 Newton. As a result, the rotational speed difference 102 quickly approaches zero, and in connection with this the mechanical synchroniser is displaced to an engaged position 107 with the on-coming idler gear, and the dog-teeth of the mechanical synchroniser 25 engages with corresponding recesses in the fourth idler gear to provide a positive rotation locking.

At time t5 the mechanical synchroniser 25 is fully engaged with the on-coming fourth idler gear and the electric motor 2 is commanded to ramp up traction torque 101 to the driving wheels again, and at time t6 the target traction torque 101 is reached.

One example approach for calculating the limit rotational speed ω_lim in the example embodiment described with reference to FIG. 9 and FIG. 10 is to the use the following equation:

$$\omega_{lim} = \omega_{final} - \text{sign}(\alpha_{J_{red}}) * \sqrt{\frac{(A * W_{lim} * SF)}{0.5 * \left(J_{red} + \frac{Td}{\alpha_{J_{red}}}\right)}} \quad \text{Equation 3}$$

Where α_{Jred}=rotational acceleration
A=Gross friction surface area of mechanical synchroniser
W_{lim}=Maximal frictional work
SF=Safety factor, such as for example 0.9 representing 90%
J_{red}=Combined moments of inertia of the masses to be synchronized, such as rotor of electric traction motor and associated rotating parts of the transmission (shafts, gears)
Td=Drag torque of idler gear of the final driving gear
"Sign" indicates positive or negative number, i.e. Sign (positive number)=1; Sign(negative number)=−1; Sign (0)=0

Figure 5A:
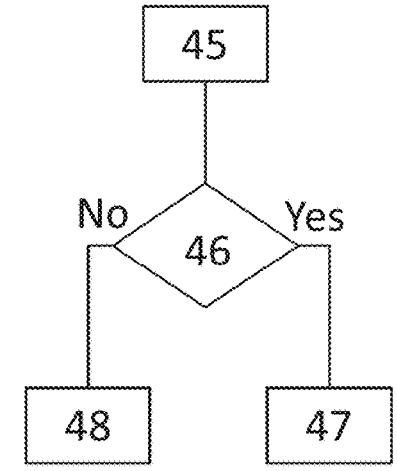
FIG. 5A shows a flow chart of a development of the flow chart of FIG. 4.

FIG. 5A schematically illustrates a further development of the method for performing rotational speed synchronisation described with reference to FIG. 4. As before, the method checks in step 46 whether the calculated total frictional work exceeds a maximal frictional work W_{lim} of the mechanical synchroniser 25, or not. According to the further development of the method, if the calculated total frictional work does not exceed a maximal frictional work W_{lim} of the mechanical synchroniser, the method in step 48 performs the rotational speed synchronisation by means of the mechanical synchroniser 25 only. This means that the synchronisation sequence in certain operating conditions of the drive train can be performed by the mechanical synchroniser 25 alone, without assistance of the electric traction motor 2, and still without risk for damage due to overheating. This approach enables a cost-effective and often quick synchronisation sequence because the high engagement force of the mechanical synchroniser 25 typically results in short synchronisation time period.

According to an alternative embodiment of the above-described further development, the method comprises, if the calculated total frictional work does not exceed 70-99%, specifically 80-99%, and more specifically 75-95%, of the maximal frictional work W_{lim} of the mechanical synchroniser 25, the method in step 48 performs the rotational speed synchronisation by means of the mechanical synchroniser 25 only, and otherwise the method in step 47 performs rotational speed synchronisation of the first transmission component by means of both the electric traction motor 2 and the mechanical synchroniser 25, either completely sequentially, or partly sequentially and partly overlapping in time, or completely overlapping in time. This means that the synchronisation sequence can be performed by the mechanical synchroniser 25 alone, without assistance of the electric traction motor 2, and here with a further reduced risk for damage due to overheating, because the method only decides to proceed with rotational speed synchronisation by means of the mechanical synchroniser 25 only if there exists a safety margin of 1-30% or 1-20% or 5-25%. This approach may result in a slightly slower synchronisation time period but with less risk for damage of the mechanical synchroniser 25.

Figure 5B:
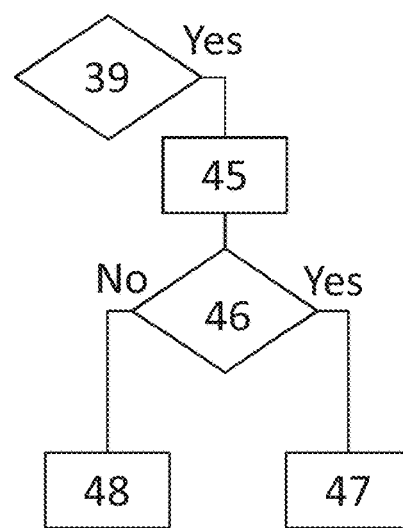
FIG. 5B shows a flow chart of a development of the flow chart of FIGS. 4 and 5A

FIG. 5B schematically illustrates a further alternative embodiment, wherein the method further comprises a step 39, to be performed prior to the step 45 of calculating the total frictional work, of checking the currently available power level in the electric storage system 8 of the hybrid electric or electric drive train, and if YES, i.e. if the check reveals that the currently available power level in the electric storage system 8 is below 25 kW, specifically below 15 kW, and more specifically below 5 kW, then method proceeds to calculating a total frictional work resulting from performing the total rotational speed synchronisation by means of a mechanical synchroniser 25 of the stepped gear transmission 3 only. This embodiment may avoid unnecessary prediction of the total frictional work resulting from performing the total rotational speed synchronisation by means of a mechanical synchroniser 25 only, because synchronisation by means of the mechanical synchroniser is typically only relevant when the power level of the electric storage system is relatively low. With a relatively high power level of the electric storage system synchronisation is often performed faster by means of the electrical traction motor 2

Furthermore, according to a further alternative embodiment, if the check in step 39 reveals that the currently available power level in the electric storage system 8 is not below 25 kW, specifically below 15 kW, and more specifically below 5 kW, then method proceeds with performing the total rotational speed synchronisation by means of a the electric traction motor 2 only.

Figure 6A:
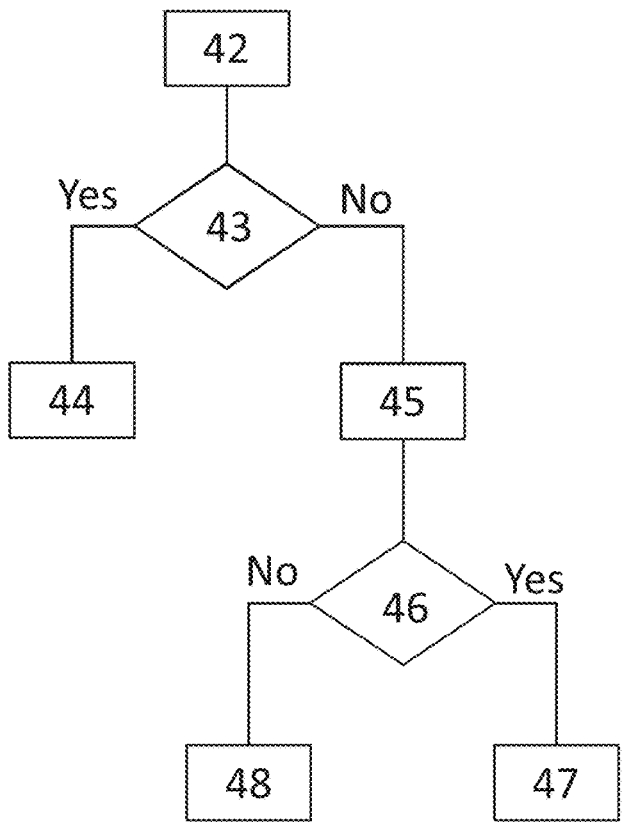
FIG. 6A shows a flow chart of a further development of the flow chart of FIGS. 4 and 5A.

According to still a further example development of the method, as illustrated in FIG. 6A, the method may further comprise the following steps, to be performed prior to the step 45 of calculating the total frictional work: in a first step 42 calculating a first time period for performing the total rotational speed synchronisation by means of only the electric traction motor 2, and calculating a second time period for performing the total rotational speed synchronisation by means of only a mechanical synchroniser 25 of the stepped gear transmission 3, and thereafter in a following step 43 checking if the first synchronisation time period does not exceed the second synchronisation time period, and if the answer is YES, i.e. the time period for performing the total rotational speed synchronisation by means of only the electric traction motor 2 is smaller than or equal to the time period for performing the total rotational speed synchronisation by means of only a mechanical synchroniser 25, then the method in step 44 performs the synchronisation by means of the electric traction motor 2 only. However, otherwise, i.e. if the time period for performing the total rotational speed synchronisation by means of only the electric traction motor 2 is larger than the time period for performing the total rotational speed synchronisation by means of only a mechanical synchroniser 25, then the method in step 45 calculates the total frictional work resulting from performing the total rotational speed synchronisation by means of a mechanical synchroniser 25 of the stepped gear transmission only, as described with reference to FIGS. 4 and 5 above.

According to a slightly modified version of the further development of the method described above with reference to FIG. 6A, step 43 may involve checking if the first synchronisation time period does not exceed the second synchronisation time period more than 25%, specifically more than 10% of the first synchronisation time period, and if the answer is YES, i.e. the time period for performing the total rotational speed synchronisation by means of only the electric traction motor 2 is not more than 25% longer, specifically not more than 10% longer, than the time period for performing the total rotational speed synchronisation by means of only a mechanical synchroniser 25, then the method in step 44 performs the synchronisation by means of the electric traction motor 2 only. This alternative embodiment thus utilises only the electric traction motor 2 for synchronisation also when synchronisation by means of the mechanical synchroniser 25 may be slightly faster, because the potential wear of the mechanical synchroniser 25 may be deemed more problematic than an up to 25% or longer, or up to 10% longer synchronisation time period.

The second time period, i.e. the time period for performing the total rotational speed synchronisation by means of only a mechanical synchroniser 25 can be derived by calculating is in equation 2 above.

The first time period, i.e. the time period for performing the total rotational speed synchronisation by means of only the electric traction motor 2, can be calculated based on a loss map according to FIG. 14, which will be described more in detail below, in combination with the following steps:

1. Collect the level of power that is currently available in the battery, for example from a battery management system
2. Calculate $J_{em\_ext}$, where $J_{em\_ext}$=all inertia connected to electric motor, including for example gears, idlers, input shaft, etc.
3. Calculate $\Delta\omega=\omega_{initial}-\omega_{final}$,
4. Calculate sign($\Delta\omega_{em}$)
5. Declare time t=0
6. Declare $\omega_{em\_now}$(time t==0)=$\omega_{initial}$
7. Declare efficiency (time t=0)=some random value
8. Declare time_step, such as for example 1 ms.
9. Start of loop
   a. Check to if $\omega_{em\_now}$ is equal to $\omega_{final}$
      i. IF NOT; CONTINUE until End of loop Step 12
      ii. IF YES; then COLLECT $t_{se}$=t and $\omega_{em\_now}$ (from t=0 until t=$t_{se}$)
10. Calculate $T_{em}$(t), where $T_{em}$=torque from electric motor
    Send $\omega_{em_{now}}$(t), W, efficiency(t) to loss map in FIG. 14
    Also update efficiency(t+time_step)=final updated of efficiency in loss map in FIG. 14 to speed up algorithm.
11. Calculate $\omega_{em\_now}$ (t+time_step) i.e. speed of electric motor if a Torque $T_{em}$ is applied to it for a time duration of time_step, while it's speed right now is $\omega_{em-now}$ (t)

$$\omega_{em\_now}(t + \text{time\_step}) = \qquad \text{Equation 4}$$
$$(\text{sign}\Delta\omega_{em}) * \frac{T_{em}(t)}{J_{em\_ext}} * \text{time\_step} + \omega_{em\_now}(t)$$

12. Update time t=t+time_step
13. End of loop GOTO Start of loop step

From the collected values above we get $t_{se}$ i.e. the synchronization time period from using electric motor only.

The loss map is a tool for predicting the output torque of the electrical traction motor based on available battery power, rotational speed and electric motor losses. The torque the electric motor can provide during shift depends on the battery power available and losses in the motor=function (motor speed, Torque). Torque is calculated from the algorithm shown in FIG. 14. As shown in FIG. 14, a torque $T_{em}$ is based on an initial guess of efficiency. Then $T_{em}$ and current electrical motor speed is used to find corresponding losses $W_{loss}$ from a look-up table. Based on $W_{loss}$, input battery power and current motor speed, a torque based on output power $T_{op}$ is calculated. If the $W_{loss}$ is the correct loss value then $T_{em}=T_{op}$ or equivalently the percentage $$\text{error} = \text{abs}\left[\frac{T_{em} - T_{op}}{T_{em}} * 100\right] == 0.$$

Figure 14:
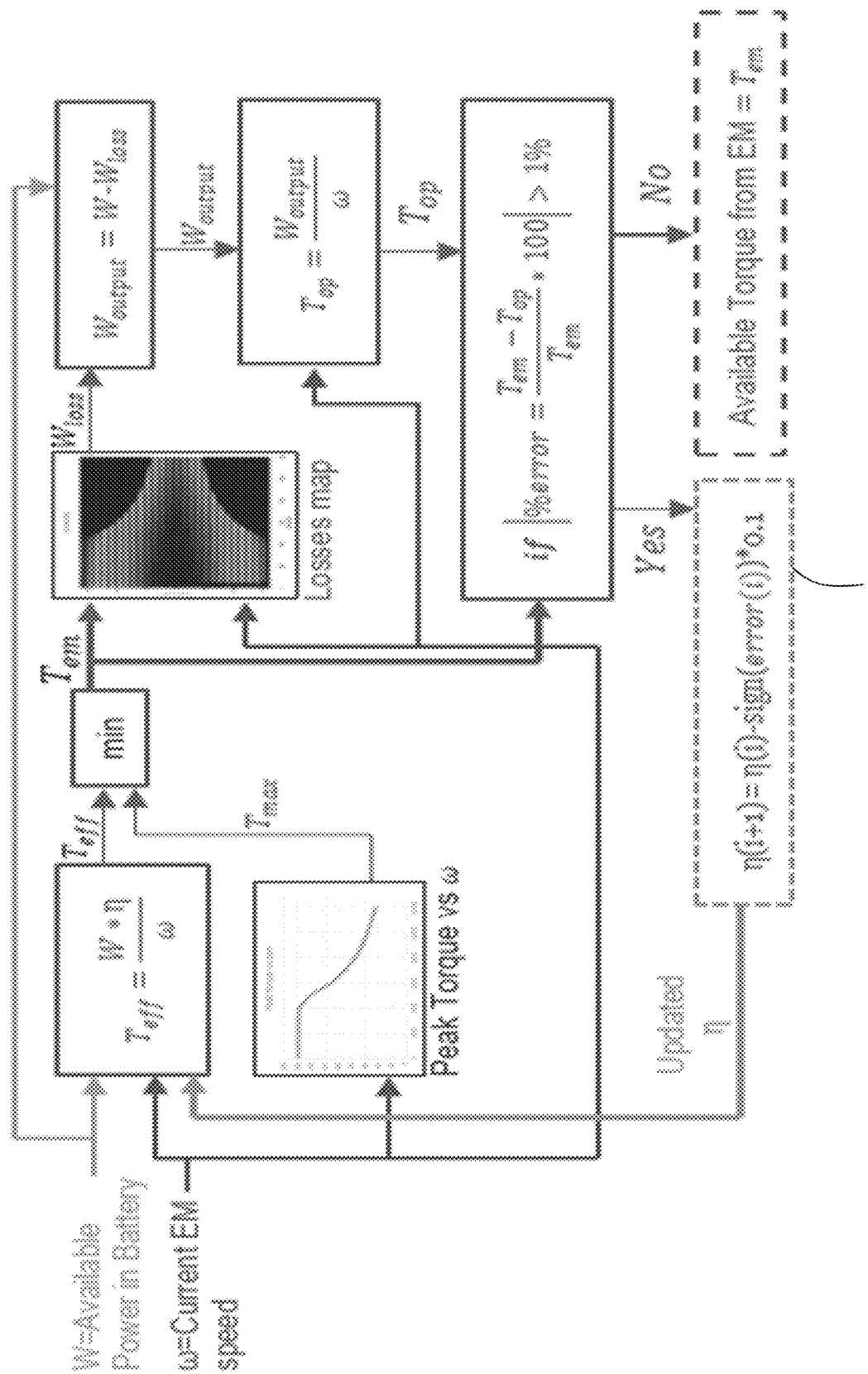
FIG. 14 shows an example for calculating torque of electric traction motor based on rotational speed and electric storage system power.

If $W_{loss}$ is not the correct value, then this implies that the value of $T_{em}$ used in lookup was wrong, which implies that the initial guess of efficiency n was wrong, then η is updated with the update law shown in the dotted square 140 in FIG. 14. Value of η is updated until the absolute percentage error≤1.

The working of the algorithm is demonstrated by a simple test case. Suppose the torque motor can give at 3800 rpm when battery power is 5 kW is required. The initial guess of efficiency is 92%. The convergence of error "denoted by highlighted value" and efficiency is shown in the table below:

| Iteration# | Efficiency η | $T_{em}$ | $W_{loss}$ based on $T_{em}$ and ω | $T_{op}$ | % error | Updated efficiency |
|---|---|---|---|---|---|---|
| 1 | 92% | 11.5597 | 292.8832 | 11.8289 | −2.33 | 93% |
| 2 | 93% | 11.6853 | 294.7428 | 11.8242 | −1.19 | 94% |
| 3 | 94% | 11.8110 | 296.6024 | 11.8195 | −0.07 | |

One option to make the calculation of the first time period faster may be to make a length of the time_step in step 8 above a function of currently available battery power. For example, time_step=1 ms may be selected when battery power is about 40 kW, and time_step=10 ms may be selected when battery power is about 5 kW. Thereby the calculation for deriving the second time period may be performed much faster but with substantially same accuracy.

According to an alternative embodiment, one or some or all of the equations 1-4, and associated calculation steps, described above for calculating the total frictional work W, the first and second time period and the limit rotational speed ω_lim may be replaced by look-up tables, such that no calculations must be performed. Look-up table implementation may for example be advantageous when only limited computational capacity is available, such that the calculations may require too much computational resources and time. On the other hand, an implementation based on calculations of equations 1-4 above may be advantageous when only little amount of memory space is available.

Figure 11:
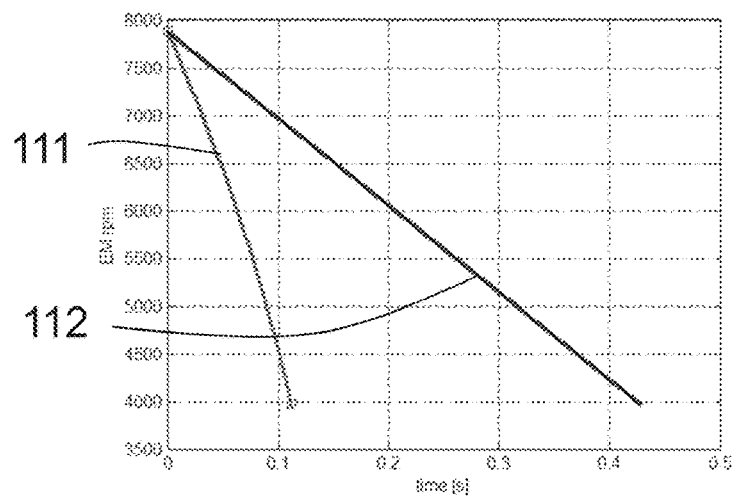
FIG. 11 shows a graph of a speed synchronisation of a first transmission component over time by means of either the mechanical synchroniser only or the electric traction motor only for a first electric storage system power level.

FIG. 11 schematically illustrates an example synchronisation behaviour when performing the total rotational speed synchronisation 111 during a gear change from driving gear two to driving gear four at 65 kilometre per hour by means of only the electric traction motor 2 and with a fully charged battery of about 40 kW, compared with performing the total rotational speed synchronisation by means of only a mechanical synchroniser 25 of the stepped gear transmission using about 1000 Nm engagement pressure. Following the method of FIG. 6A, in step 44, the synchronisation would be performed by means of the electric traction motor 2 only.

Figure 12:
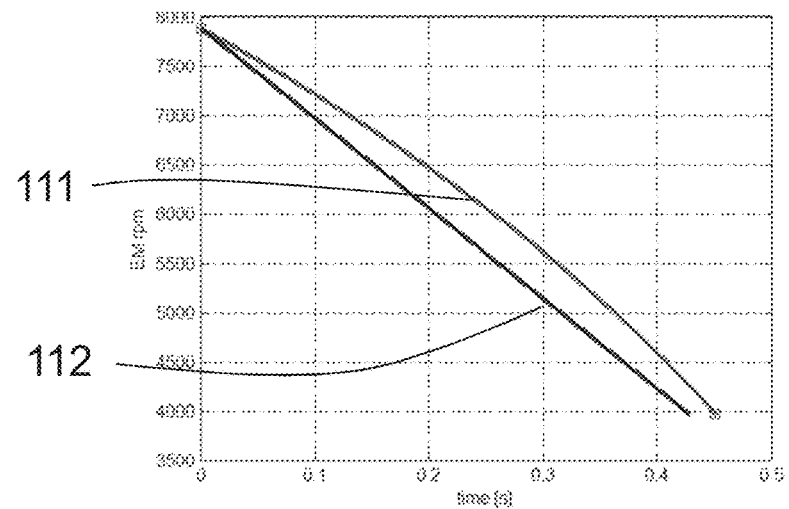
FIG. 12 shows a graph of a speed synchronisation of a first transmission component over time by means of either the mechanical synchroniser only or the electric traction motor only for a second electric storage system power level.

FIG. 12 schematically illustrates another example synchronisation behaviour when performing the total rotational speed synchronisation 111 during a gear change from driving gear two to driving gear four at 65 kilometre per hour by means of only the electric traction motor 2 and with a low charged battery of only about 10 kW, compared with performing the total rotational speed synchronisation by means of only a mechanical synchroniser 25 of the stepped gear transmission using about 1000 Nm engagement pressure. Following the method of FIG. 6A, the synchronisation would be performed by means of the mechanical synchroniser 25. In particular, the synchronisation would be performed by means of the mechanical synchroniser 25 only, according to step 48, or in combination with the electric traction motor 2, according to step 47, depending on whether the predicted total frictional work exceeds a maximal frictional work $W_{lim}$ of the mechanical synchroniser 25 or not.

Figure 13:
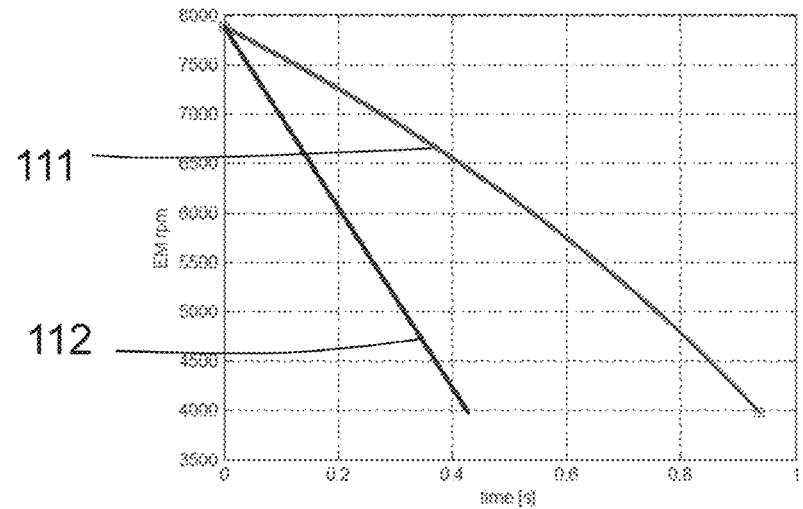
FIG. 13 shows a graph of a speed synchronisation of a first transmission component over time by means of either the mechanical synchroniser only or the electric traction motor only for a third electric storage system power level.

FIG. 13 schematically illustrates another example synchronisation behaviour when performing the rotational speed synchronisation 111 during a gear change from driving gear two to driving gear four at 65 kilometre per hour by means of only the electric traction motor 2 and with a low charged battery of only about 5 kW, compared with performing the total rotational speed synchronisation by means of only a mechanical synchroniser 25 of the stepped gear transmission using about 1000 Nm engagement pressure. Following the method of FIG. 6A, the synchronisation would be performed by means of the mechanical synchroniser 25, either alone according to step 48 or in combination with the electric traction motor according to step 47.

Figure 6B:
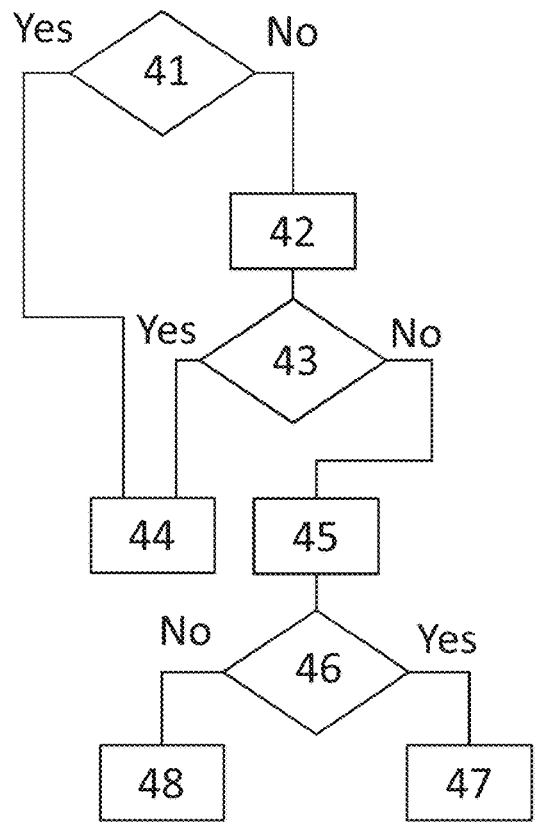
FIG. 6B shows a flow chart of a further development of the flow chart of FIGS. 4, 5A and 6A.

According to still a further example development of the method, as illustrated in FIG. 6B, the method may further comprise the following step 41, to be performed prior to the step 42 of calculating the first and second time periods, of checking whether the currently available power in the battery is above a threshold, such as for example above 15 kW, specifically, above 25 kW, or more specifically above 35 kW. If YES, i.e. if the check shows that currently available battery power is indeed above the threshold value, then performing the synchronisation by means of the electrical traction motor only.

The underlying logic behind step 41 is that synchronisation always tends to be performed faster by means of the electrical traction motor 2 when relatively large electrical power is available from the battery, such that the calculation of the first and second time periods in step 42 can be avoided. Only when the currently available power from the electric battery is starting to become weak, or if the battery capacity from the outset is relatively low, for example as in a mild hybrid electric vehicle, is it relevant to perform the calculations in step 42.

The method and drive line according to the disclosure has primarily been described in relation to gear shift and associated synchronisation when changing gear from a low gear to a higher gear, such as for example changing from driving gear two to driving gear four, and the like. However, the method and drive line according to the disclosure are equally applicable for performing smooth and quick gear shift and associated synchronisation when downshifting, that means when changing gear from a high gear to a lower gear, such as for example changing from driving gear four to driving gear two, and the like. Quick downshift for improved drivability and short torque-interrupt is for example necessary upon kickdown of the accelerator pedal, i.e. when a driver suddenly request large increase of traction torque be quickly pushing the accelerator pedal downwards to a large extent.

Although the disclosure has been described in relation to specific combinations of components, it should be readily appreciated that the components may be combined in other configurations as well, which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The invention claimed is:

1. A method for performing rotational speed synchronisation of a first transmission component having a first initial rotational speed with a second transmission component having a second initial rotational speed, so that they rotate with the same final rotational speed during a gear switch from an initial driving gear to a final driving gear in a stepped gear transmission for a hybrid electric or electric drive train having an electric traction motor, the method comprising:
calculating a total frictional work resulting from performing the total rotational speed synchronisation by means of a mechanical synchroniser of the stepped gear transmission only;
determining whether the calculated total frictional work exceeds a maximal frictional work of the mechanical synchroniser; and
performing the rotational speed synchronisation by means of both the electric traction motor and the mechanical synchroniser if the calculated total frictional work exceeds the maximal frictional work.

2. The method according to claim 1, wherein the method comprises performing the rotational speed synchronisation by means of the electric traction motor to a larger extent than the mechanical synchroniser in a first half of the rotational speed synchronisation sequence, and performing the rotational speed synchronisation by means of the electric traction motor to a smaller extent than the mechanical synchroniser in a second half of the rotational speed synchronisation sequence.

3. The method according to claim 1, wherein the method comprises performing the rotational speed synchronisation in a two-step synchronisation sequence by means of the electric traction motor to a larger extent than the mechanical synchroniser in the first step of the rotational speed synchronisation sequence, and performing the rotational speed synchronisation by means of the electric traction motor to a smaller extent than the mechanical synchroniser in the second step of the rotational speed synchronisation sequence.

4. The method according to claim 1, wherein the method comprises:
if the calculated total frictional work exceeds a maximal frictional work of the mechanical synchroniser, calculating a limit rotational speed that results in 50-100%, of the maximal frictional work of the mechanical synchroniser when rotational speed synchronisation from the limit rotational speed to the final rotational speed is performed by means of both the mechanical synchroniser and the electric traction motor, and subsequently performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of both the mechanical synchroniser and the electric traction motor.

5. The method according to claim 1, wherein the method comprises:
if the calculated total frictional work exceeds a maximal frictional work of the mechanical synchroniser , calculating a limit rotational speed that results in 50-100%, of the maximal frictional work of the mechanical synchroniser when rotational speed synchronisation from the limit rotational speed to the final rotational speed is performed by means of the mechanical synchroniser only, and subsequently performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of the mechanical synchroniser only.

6. The method according to claim 1, wherein calculation the total frictional work is performed while taking into account at least one of the following parameters:
mechanical synchroniser engagement force,
initial rotational speed,
final rotational speed, and
inertia of rotating part of electric traction motor,
and the combined moment of inertia of the masses to be synchronized.

7. The method according to claim 1, wherein the method further comprises calculating the first initial rotational speed of the first transmission component taking into account at least current accelerator pedal position, a shift map, and current driving gear.

8. The method according to claim 7, wherein the method further comprises calculating the final rotational speed of the first transmission component taking into account at least the first initial rotational speed of the first transmission component and a gear ratio of the final driving gear.

9. The method according to claim 1, wherein the method further comprising:
checking the currently available power level in the electric storage system of the hybrid electric or electric drive train;
only if said currently available power in an electric storage system of the hybrid electric or electric drive train is below 25 kW, performing said step of calculating the total frictional work resulting from performing the total rotational speed synchronisation by means of a mechanical synchroniser of the stepped gear transmission.

10. The method according to claim 9, wherein the method further comprises: if said currently available power level in the electric storage system is not below 25 kW, performing the total rotational speed synchronisation by means of a the electric traction motor only.

11. The method according to claim 1, further comprising:
calculating a first time period for performing the total rotational speed synchronisation by means of the electric traction motor only, calculating a second time period for performing the total rotational speed synchronisation by means of a mechanical synchroniser of the stepped gear transmission only, if the first synchronisation time period does not exceed the second synchronisation time period, performing the synchronisation by means of the electric traction motor only, and wherein the calculations of the first time period and the second time period are performed prior to the calculation of the total frictional work, and if the first synchronisation time period exceeds the second synchronisation time period, calculating said total frictional work.

12. The method according to claim 1, wherein the stepped gear transmission is any of:

a dual clutch transmission having a first friction clutch drivingly connected with a first shaft carrying a first set of meshing gears and a second friction clutch drivingly connected with a second shaft carrying a second set of meshing gears, wherein the electric traction motor is drivingly connected to one of the first and second shafts, or an automated manual transmission with the electric traction motor drivingly connected to a shaft of the transmission.

13. The method according to claim 1, wherein electric traction motor is a permanent magnet synchronous motor, or an induction motor, or a switched reluctance motor, or a DC motor.

14. A method for performing rotational speed synchronisation of a first transmission component having a first initial rotational speed with a second transmission component having a second initial rotational speed, so that they rotate with the same final rotational speed during a gear switch from an initial driving gear to a final driving gear in a stepped gear transmission for a hybrid electric or electric drive train having an electric traction motor, the method comprising:

calculating a total frictional work resulting from performing the total rotational speed synchronisation by means of a mechanical synchroniser of the stepped gear transmission only, if the calculated total frictional work exceeds a maximal frictional work of the mechanical synchroniser, performing the rotational speed synchronisation by means of both the electric traction motor and the mechanical synchroniser, and if the calculated total frictional work does not exceed a maximal frictional work of the mechanical synchroniser, performing the rotational speed synchronisation by means of the mechanical synchroniser only.

15. A drive train for a hybrid electric or electric vehicle, the drive train comprising:

a stepped gear transmission having a plurality of driving gears and at least one mechanical synchroniser, an electric traction motor, and a transmission control unit, wherein the transmission control unit is configured to perform rotational speed synchronisation of a first transmission component having a first initial rotational speed with a second transmission component having a second initial rotational speed, so that they rotate with the same final rotational speed during a gear switch from an initial driving gear to a final driving gear by means of:

calculating a total frictional work resulting from performing the total rotational speed synchronisation by means of a the mechanical synchroniser of the stepped gear transmission only;

determining whether the calculated total frictional work exceeds a maximal frictional work of the mechanical synchroniser; and performing the rotational speed synchronisation by means of both the electric traction motor and the mechanical synchroniser if the calculated total frictional work exceeds the maximal frictional work.

16. The drive train according to claim 15, wherein the transmission control unit is configured to perform the rotational speed synchronisation by means of the electric traction motor to a larger extent than the mechanical synchroniser in a first half of the rotational speed synchronisation sequence, and performing the rotational speed synchronisation by means of the electric traction motor to a smaller extent than the mechanical synchroniser in a second half of the rotational speed synchronisation sequence.

17. The drive train according to claim 15, wherein if the calculated total frictional work exceeds a maximal frictional work of the mechanical synchroniser, the transmission control unit is configured to calculating a limit rotational speed that results in 50-100%, of the maximal frictional work of the mechanical synchroniser when rotational speed synchronisation from the limit rotational speed to the final rotational speed is performed by means of both the mechanical synchroniser and the electric traction motor, and subsequently performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of both the mechanical synchroniser and the electric traction motor.

18. The drive train according to claim 15, wherein if the calculated total frictional work exceeds a maximal frictional work of the mechanical synchroniser, the transmission control unit is configured to calculating a limit rotational speed that results in 50-100%, of the maximal frictional work of the mechanical synchroniser when rotational speed synchronisation from the limit rotational speed to the final rotational speed is performed by means of the mechanical synchroniser only, and subsequently performing a two-step synchronisation sequence comprising first performing rotational speed synchronisation from the initial rotational speed to the limit rotational speed by means of the electric traction motor only, and thereafter performing the remaining rotational speed synchronisation from the limit rotational speed to the final rotational speed by means of the mechanical synchroniser only.

19. The drive train according to claim 15, wherein the transmission control unit further is configured for, if the calculated total frictional work does not exceed a maximal frictional work of the mechanical synchroniser, performing the rotational speed synchronisation by means of the mechanical synchroniser only.

20. The drive train according to claim 15, wherein the transmission control unit is configured to check the currently available power level in the electric storage system of the hybrid electric or electric drive train, and only if said currently available power in an electric storage system of the hybrid electric or electric drive train is below 25 kW, perform said step of calculating the total frictional work resulting from performing the total rotational speed synchronisation by means of a mechanical synchroniser of the stepped gear transmission.

21. The drive train according to claim 20, wherein if said currently available power level in the electric storage system is not below 25 kW, the transmission control unit is configured to perform the total rotational speed synchronisation by means of a the electric traction motor only.

* * * * *